United States Patent [19]

Schulman et al.

[11] Patent Number: 4,820,538

[45] Date of Patent: Apr. 11, 1989

[54] PROCESS TO PRODUCE A CHARCOAL BROILED FLAVOR

[75] Inventors: Marvin Schulman, Howell; Harry Hannah, Toms River; Richard B. Stevenson, Manalapan; Gerald P. Case, Jackson, all of N.J.

[73] Assignee: General Foods Corporation, White Plains, N.Y.

[21] Appl. No.: 54,639

[22] Filed: May 27, 1987

[51] Int. Cl.$^4$ .............................................. A23L 1/232
[52] U.S. Cl. .................................... 426/533; 426/417; 426/487; 426/650
[58] Field of Search ................ 426/533, 417, 650, 487

[56] References Cited

U.S. PATENT DOCUMENTS 4,154,866  5/1979  Dainius et al. ...................... 426/650
4,571,342  2/1986  DiCicca et al. ................. 426/574 X Primary Examiner—Donald E. Czaja
Assistant Examiner—Celine T. Callahan
Attorney, Agent, or Firm—Thomas A. Marcoux; Michael J. Quillinan; Daniel J. Donovan

[57] ABSTRACT

A process of producing a charcoal broiled flavor is provided by distributing a heated fat or oil as a thin film which is exposed to a temperature of at least 600° F. for a period of time less than 2 minutes to exothermically heat the fat to at least 650° F. and thereafter rapidly cooling the flavor product to a temperature less than 220° F., a minor fraction of the exothermically heated oil being spent as waste vapor.

5 Claims, 1 Drawing Sheet

PROCESS TO PRODUCE A CHARCOAL BROILED FLAVOR

BACKGROUND OF THE INVENTION

This application is an improvement in the novel flavoring composition set forth in U.S. Pat. No. 4,571,342 to DiCicca et al. Issued Feb. 18, 1986 for charcoal broiled flavor composition.

The enhancement of foods products with meat-like flavors of the type set forth in the aforesaid DiCicca patent has enjoyed considerable commercial success. The demand for meat flavored products continues and the preparation of sausage and purees or meat analogs, pet foods and meat extended products are all benefitted by a meat flavor characterized as having a charcoal broiled nature.

The DiCicca et al. process involves, as is stated in the patent, subjecting a film of fat or oil to temperatures within the range of 302° F.–855° F. in the presence of oxygen for a period of time effective to develop charcoal or charred meaty flavor notes, and collecting the treated fat or oil. Unfortunately, when one scales such a process to a significant degree there is an ineffective use of the equipment and the reaction is inconsistent. The flavors that are produced can generate harsh notes which tend to detract from the overall flavorful impact of the composition.

SUMMARY OF THE INVENTION

Basically, the present invention carries forward the teachings of DiCicca et al. in a controllable manner whereby the flavor development is enhanced by a continuous exothermic reaction, which is thereafter quenched to a temperature whereat the exothermic reaction is eventually terminated. The exothermic reaction is carried out in the presence of air ideally, although pure oxygen may also be employed; stated as a level the oxygen present, 1 to 1½ parts oxygen to 1 part fat or oil will be employed, it being understood that the fat or oil will contain the notes responsible for the charcoal broiled taste development of the flavor process. Exothermy is carried out in a thin film heat exchanger wherein the hot fat or oil is distributed as a thin film and undergoes a phase change into smoke, the exothermy continuing throughout the process balance, whereby the smoke is heated exothermically and leaves the heat exchanger at a temperature of at least 650° F., typically 670°–700° F., the heat exchanger per se being at a temperature of at least 600° F. Upon exiting the heat exchanger, the smoke is rapidly quenched say in less than 20 seconds and commonly in about 10 seconds, by means which will become apparent in the accompanying description, until the smoke flavor is recovered as a flavored oil; the oil phase will be at a temperature within the range of from 210° F. to 230° F. at this point. Incident to this process there will be a 10-20% dissipation of the smokey constituents containing tarry and acrid notes which will eventually be spent as vapor to the atmosphere.

Through this medium of thin film exothermy, smoke that is generated and eventually recovered as a flavoring oil will be generally free of a harsh flavor notes. It is found that such notes are removed as the typically 10-20% separated phase created incident to cooling.

DETAILED DESCRIPTION OF THE INVENTION

Figure 1:
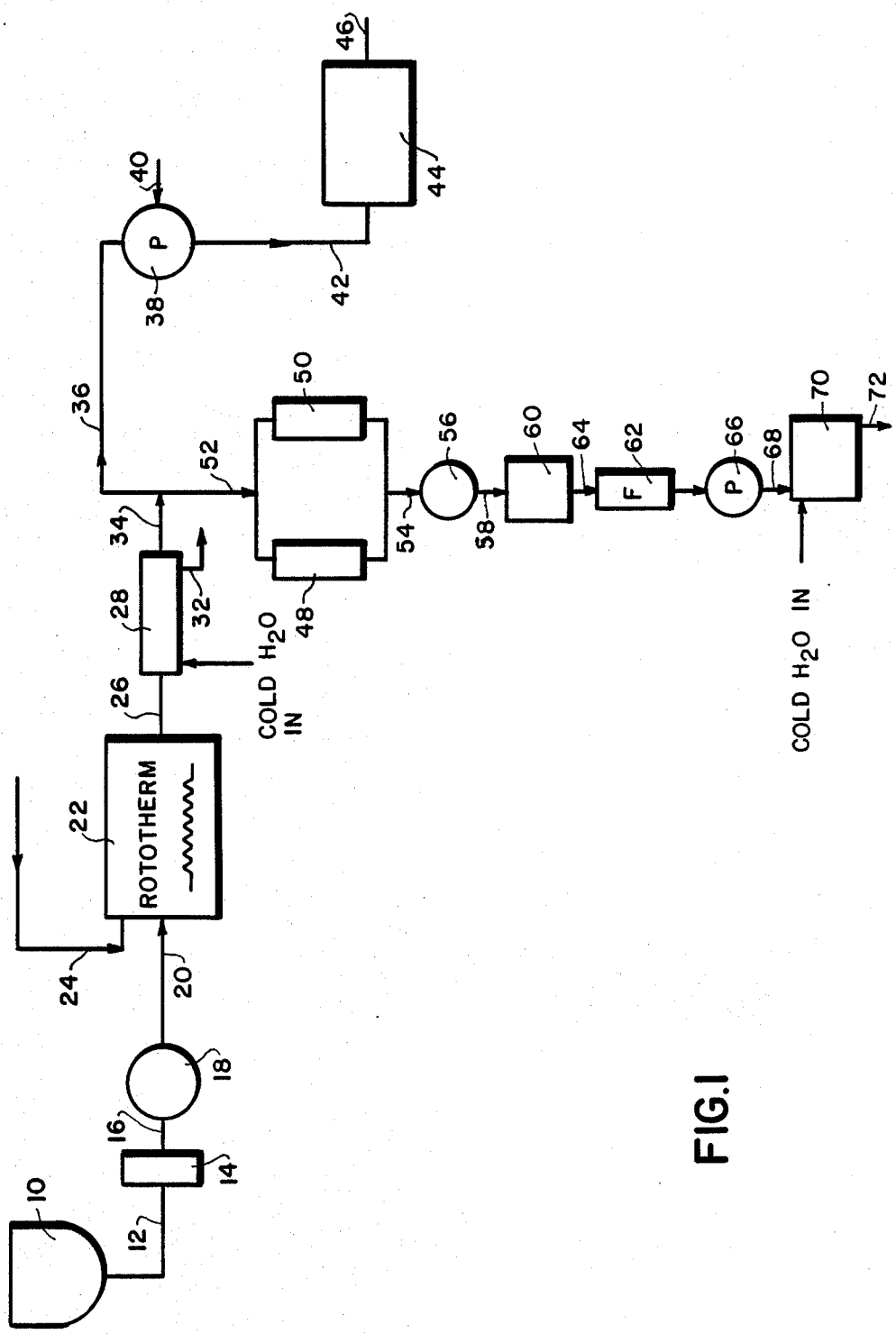
FIG. 1 is a diagram of the processing steps utilized in producing a charcoal broiled flavor while simultaneously removing tarry and acrid notes to yield an improved flavor.

The invention will now be described by reference to the accompanying drawing wherein FIG. 1 displays the general overall pattern for a flavor and aroma collection process. The tallow which may be beef, kosher beef, chicken, lard, turkey and like flavoring fats and oils is heated in an open kettle to a temperature exceeding 160° F. and generally at such temperature that it becomes fluid. Referring to the accompanying drawing, the kettle 10 is charged through line 12 to a filter 14 whereat undesired materials are removed and whereafter the filtrate passes line 16 to a positive displacement feed pump 18 and enters through line 20 into a rototherm 22. The temperature in the lines 12, 16 and 20 is generally heated to the neighborhood of 200° F. prior to entry into the rototherm 22.

At the same time air is metered by means not shown through line 24 also entering rototherm 22. The air is compressed and then filtered to keep it clean; in this way a good quality of oxygen in particular and air preferably is charged to the rototherm. The rototherm is maintained under a slight positive pressure not exceeding 15–20 pounds per square inch guage.

The heated fluid in the rototherm is distributed as a thin film being generally of a thickness no greater than 1/16th of an inch and typically somewhere between 1/32nd and 1/16th of an inch. The fat phase will transfer to an exothermic gaseous phase. Considered in combination, these phases (liquid and gaseous fat), will be treated for a period not exceeding 2 minutes, normally in the neighborhood of 90 seconds or less. During this retention time, the fat phase will be elevated in temperature by the heat exchanger in the presence of air, the fat being charged in such manner that the initial liquid phase exists a very minor percent of the total time in the rototherm, typically less than 20 seconds. Under ideal conditions the hot film will be rapidly vaporized, vaporization commencing at above 600° F. generally.

The flavor developed upon exiting the rototherm is thereupon fed through line 26 to a cooler which in the drawing is a heat exchanger 28, cold water issuing at 32 from the cooler and the product issuing at line 34 therefrom at a temperature as indicated generally within the range of from 210° F. to 230° F. At this point the flavor process has been essentially terminated and the flavorant per se will exist in the form of a liquid, a minor portion by weight of the reacted gaseous constituents being spent through vapor line 36, typically 10-20% of the reaction product. The vapor phase in line 36 passes a suitable vacuum pump 38, fresh air being drawn in at 40 and the air-smoke mixture containing harsh tarry and acrid notes passing line 42 to a thermal incinerator 44, the combustion products exiting at 46. The cooling temperature of from 210° F. to 230° F. is critical to the invention because it will determine the percentage yield and the amount of spent vapor. The higher the cooling temperature at 36 the greater then amount of spent vapor and consequently the lower percentage yield. At the aforesaid temperature range, an acceptable yield is obtained but yet a majority of off flavor notes are removed in the spent vapor.

The flavorant of use in line 52 is filtered in a liquid state to remove carbonaceous particles at either 48 or 50 which are operated independently and alternately. The thus filtered fluid passing line 54 enters a positive displacement pump 56 from which it is displaced at 58 to a collection vessel 60 and thereafter is filtered again by passing line 64 and filtration device 62. The material is eventually exposed to an antioxidant which is admixed therewith in pump 66 and then discharges from pump 66 to line 68 to a votator which cools and mixes the flavorants and the antioxidants at 70. The product produced is recovered at 72. The votator 70 is operated so as to admit cold water to the jacket thereof, thus further cooling the flavoring liquid, the material collected at 72 being 100° F. or less.

It should be noted that the rototherm 22 is specially modified by closing off the vapor vent that would normally remove vapors while concentrating; secondly, the heat exchange medium which is normally a heat transfer fluid has been replaced by an electric resistance heater; e.g. a standard thin film processor such as is manufactured by Artison Industries, Inc. and is described in their bulletin No. 4027-I as an Artison Rototherm E will be the desired processor, the processor being a 1 square foot heat centrifugally-wiped exchanger; it will be noted that the 1 square foot refers to the heating surface per se of the process.

Basically, the flavor process is critical to the present invention. The flavors that are generated and that are common to this invention occur during the exothermic heating. The temperature of the fat will eventually be at a point where it exceeds the surface temperature of the heat exchanger itself. Thus, as indicated previously the minimum heat exchange surface temperature will be in excess of 600° F. measured at the heat exchanger surface and, in a relevantly brief period of time, exothermy will be experienced resulting in a temperature increase of the fat generally of 50° F. with regard to the temperature of the heating surface itself, a range of 40° F. to 75° F. being the terminal temperature of the controlled exothermy above the temperature of the heat exchange surface.

It will be understood that this process therefore involves a very careful control of heat temperatures by the processes set forth herein. There is greater control of the reaction and particularly the heat temperature process thereof which results in a more uniform end product and avoid the formation of off flavor notes. In addition, the process desirably involves subsequently cooling in a relatively rapid fashion and the spending of a minor weight percent of the vapors as at line 36 so as to further separate undesired flavor notes.

The invention will now be described by reference to operative examples.

EXAMPLE 1

Beef tallow derived by taking fresh meat scraps from a meat processing operation is treated. The tallow will contain the desired flavor precursors. The following physical and chemical properties and limits are achieved in the final product.

| Property | Limits |
| --- | --- |
| Moisture | 1.0%(Max.) |
| Free Fatty Acid | 1.0–4.0% |
| Peroxide Value | 5–36% |
| Iodine Value | 36–45 |
| Unsaponifiables | 1.25%(Max.) |
| Antioxidant BHA (From Tenox 7) | 50–60 ppm (On Fat Basis) |

The foregoing process is practiced and the physical and chemical properties are realized in a process having the following characteristics.

| NATURAL GRILL FLAVORS | | |
| --- | --- | --- |
| | Preferred | Optimal |
| Property | Target | Range |
| Finished Product Flow Rate (lbs./hr.) | 33 | 31–36 |
| Air Flow Rate (cubic ft./hr.) | 150 | 140–160 |
| Product Reaction Temp. (°F.) at the exit of the Rototherm | 675 | 670–680 |
| Vapor Sep. Temp. (°F.) at point 34 on flow chart | 220 | 210–230 |
| Vacuum (in. Hg) at point 36 on flow chart | 0.40 | 0.20–1.0 |
| Heat Temp (°F.) measured at the inside surface of reactor 22 of the inside cavity of wall reactor | 620–640 | 610–670 |

The finished product flow rate will generally be 85% of the entering flow rate to the rototherm. The product reaction temperature at the exit and of the rototherm will be the gas temperature, that is, the vapor temperature leaving the rototherm. The vapor separation temperature will be the temperature at point 34 on the flow chart.

It should be noted, that in line 36 there is a slight vacuum to facilitate the removal of the vapors that are unwanted and to be discarded. The heater temperature will be as stated, that which is measured at the inside surface of the reactor 22 at the inside cavity wall of the reactor.

The foregoing conditions represent those which may be practiced in treating beef fat, kosher beef, chicken, port or turkey. It is contemplated that the foregoing conditions generally apply to the treatment of all foodstuffs.

The product produced by this process can be used as a liquid as such and can be sprayed or otherwise applied, all of which is within the skill of the calling. On the other hand, the product itself may be spray-dried or otherwise reduced to a free-flowing powder, all of which similarly will occur to those skilled in the art. The product aromas will generally have an improved charcoal type overall flavor, as indicated previously relative to that of DiCicca et al.

What is claimed is:

1. An improved process for preparing a flavor composition comprising:
  (a) subjecting a thin film of a fat or oil suitable for producing a charcoal broiled flavor to a temperature of at least 600° F. in the presence of oxygen in a thin film heat exchanger for a period of time less than 2 minutes, said time and temperature being sufficient to cause the oil or fat to undergo a phase change to produce an exothermic gaseous material having a temperature of at least 650° F., the time period that the oil or fat is in the gaseous phase representing a major percent of the reaction time; and (b) rapidly cooling the gaseous material to produce an oil phase within the temperature range of 210° F. to 230° F. and a minor portion of a vapor phase containing tarry and acrid notes which is removed under a vacuum from said oil phase to produce an improved flavor composition free of harsh flavor notes.

2. The process of claim 1 wherein the vacuum measures from 0.2 to 1.0 inches of mercury.

3. The process of claim 1 wherein the exothermic gaseous material reaches a maximum temperature of from 40° F. to 75° F. above the temperature of the heat exchanger.

4. The process of claim 1 wherein the time in step (a) is 90 seconds or less.

5. The process of claim 1 wherein the exothermic gaseous phase in step (a) reaches a temperature within the range of from 670° F. to 700° F.

* * * * *